March 28, 1967 P. P. JOHNSON 3,311,504
FUEL CELL
Filed May 2, 1960
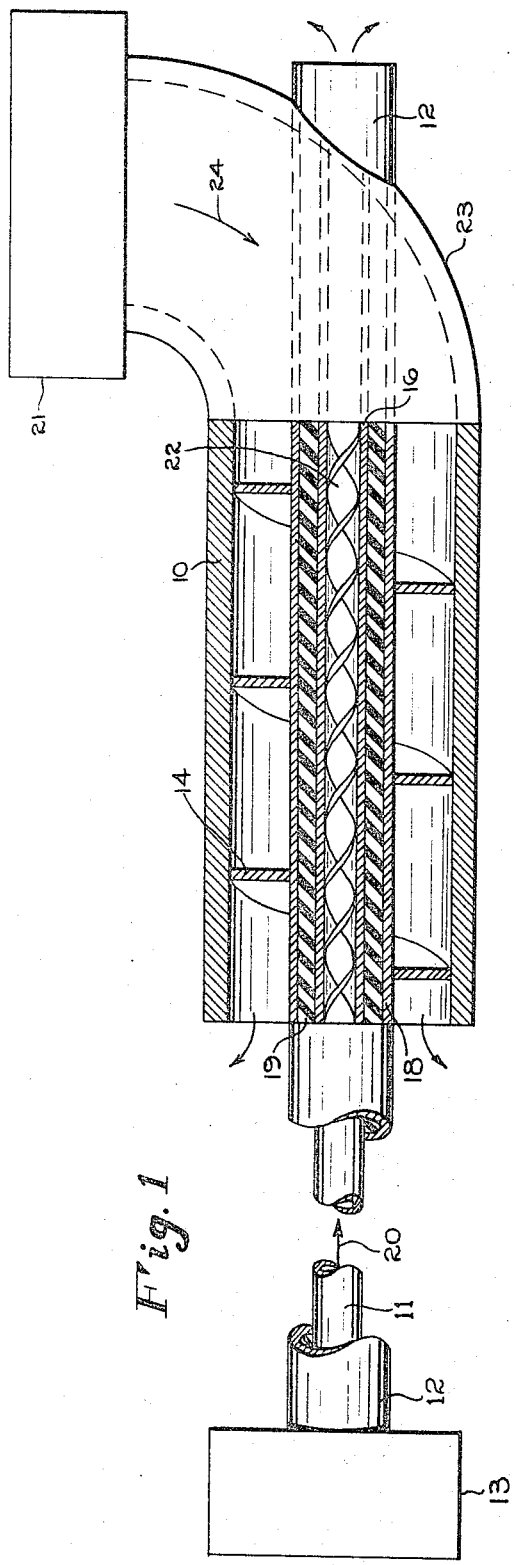
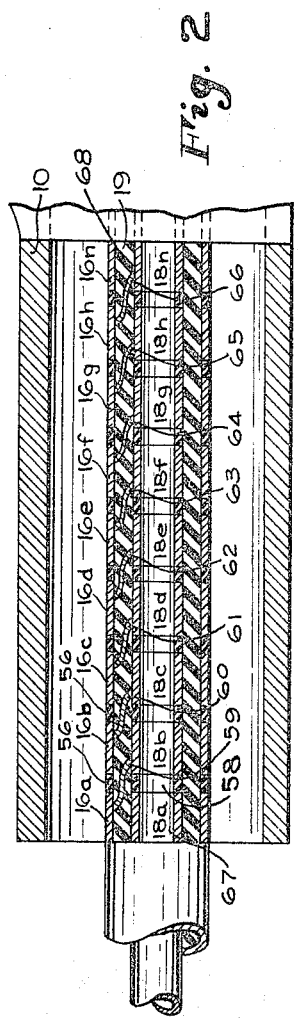
INVENTOR.
PAUL P. JOHNSON
BY
Watson, Cole, Grindle & Watson
ATTORNEYS

United States Patent Office 3,311,504
Patented Mar. 28, 1967

3,311,504
FUEL CELL
Paul P. Johnson, Saunderstown, R.I., assignor to Leesona Corporation, Cranston, R.I., a corporation of Massachusetts
Filed May 2, 1960, Ser. No. 26,114
4 Claims. (Cl. 136—86)

This invention relates to fuel cells and more particularly to an improved construction for a fuel cell.

Priorly, numerous forms of devices have been employed in the production of electrical energy from the electrochemical combustion of fuel gases. In the known forms of prior art devices gases have been employed to produce an electrochemical action in an electrolyte positioned between a pair of electrodes for the generation of electrical potentials on the electrodes. In these devices which employ gaseous fuels the problem of removal of the used gaseous products is quite important. Further, the problem of removing the used gaseous products before they contaminate the incoming gases, thereby reducing the rate of chemical reaction, is important. If the products of combustion are removed in the same manner and direction from which they are inserted into the cell, a certain reduction of concentration of the incoming fuel gases with the by-product of the chemical reaction takes place. The problem is particularly difficult to solve since both the fuels and the by-products are gaseous.

Accordingly, it is an object of this invention to provide an improved fuel cell construction.

It is another object of this invention to provide an improved fuel cell construction which is particularly adapted for the use of gaseous fuels.

It is a still further object of this invention to provide a fuel cell in which the used products of combustion do not contaminate or inhibit the incoming fuels.

It is a still further object of this invention to provide a fuel cell construction which is simple and economical to manufacture.

It is a further object of this invention to provide a fuel cell construction which improves the efficiency of the energy generation by maintaining a substantially constant pressure differential between the respective gases.

Briefly, in accordance with aspects of this invention, a fuel cell is formed of concentric or coaxial surfaces which are open at both ends. The fuel is introduced on the inside of the inner surface, while the air or oxidizer is introduced between the surfaces. The inner surface is comprised of porous material which is impregnated with an electrolyte and, advantageously, has electrodes on its inner and outer surfaces. The chemical reaction takes place between the electrodes and within the electrolyte such that electrical potentials are generated on the electrodes. Also, advantageously, the fuel is introduced at one end of the concentric or coaxial surfaces, while the air or oxidizing gas is introduced between the surfaces at the opposite end of the cell. In such a form the incoming air is heated by the exhaust products of combustion of the exothermic electrical generation reaction and the fuel is heated by the exhaust air. With such an arrangement the efficiency of the chemical reaction is increased. The electrodes on the opposite surfaces of the inner member may, advantageously, be in the form of continuous surfaces or they may be in the form of a series of pairs of surfaces isolated from each other by non-conducting material such that the structure is in effect a plurality of cells which may either be connected in series or parallel, as desired.

Accordingly, it is a feature of this invention to provide a fuel cell having a pair of concentric or coaxial members each of which is open at both ends.

It is another feature of this invention to employ in a fuel cell construction a pair of concentric or coaxial members which are open at both ends, to introduce fuel at one end and to introduce an oxidizer in the other end.

It is another feature of this invention to employ in a fuel cell a pair of open-ended concentric members, to coat the inner and outer surfaces of the inner member with metallic material, thereby defining electrodes, to inject fuel into the inner member at one end of the structure and to inject an oxidizer at the other end of the structure intermediate the concentric members.

It is a still further feature of this invention to employ in a fuel cell construction for use with gas fuels a pair of concentric tubes open at both ends, to coat the inner tube with metallic material on its inner and outer surfaces, to impregnate the inner tube with electrolyte material, to inject the fuel into one end of the inner tube and to inject air or oxidizing material at the opposite end of the structure between the inner end outer tubes.

It is a still further feature of this invention to employ in a fuel cell construction a pair of coaxial members which is open at both ends, to coat the inner and outer surfaces of the inner member with conducting material, to impregnate the inner member with electrolyte material, to inject the fuel at one end of the structure and to inject the air or oxidizing gas at the opposite end of the structure.

It is a still further feature of this invention to employ in a fuel cell construction a pair of coaxial members in which the inner member is impregnated with electrolyte and coated on its inner and outer surfaces with electrode material, to introduce fuel in gaseous form at one end of the inner member and to inject air or oxidizing material in gaseous form at the opposite end of the cell between the inner and outer members and to employ baffles between the members to achieve maximum circulation of the oxidant between the members.

It is a further feature of this invention to employ in a fuel cell construction a pair of coaxial members which is open at both ends, to employ the inner member as the electrode support, to impregnate the inner member with an electrolyte material, to employ a baffle within the inner member to achieve maximum circulation of the gaseous fuel within the inner member.

These and various other objects and features of the invention will be more clearly understood from a reading of the detailed description of the invention in conjunction with the drawing, in which:

FIGURE 1 depicts a sectional view in elevation of one embodiment of this invention; and FIGURE 2 is a sectional view in elevation of another illustrative embodiment of this invention.

Referring now to FIGURE 1 of the drawing, there is depicted a sectional view in elevation of one embodiment of the invention in which an outer member 10, which may be in the form of a cylinder or polygon, has mounted coaxially or concentrically therewith an inner member 12. For the sake of simplicity, these members 10 and 12 will be described as concentric cylinders. Cylinder 12 is supported within cylinder 10 by means of spiral or other forms of baffles 14 of metallic or insulating material. Advantageously, the inner member 12 has metallic material 16 on its inner surface and metallic material 18 on its outer surface, these metallic surfaces defining electrodes of the cell. The core 19 of the body of the inner member 12 may, advantageously, be formed of porous material such as a ceramic well known in the art. One example of this ceramic material is magnesium oxide. This porous body is impregnated with the electrolyte.

The metallic surfaces 16 and 18 may be formed on the porous body by any convenient method known in the art. Suitable electrical conductors, not shown, are connected to the respective electrodes 16 and 18.

In the operation of the device depicted in FIGURE 1, gaseous fuel, such as kerosene, is introduced through pipe 11 into the inner member 12 from fuel source 13 at the end designated by arrow 20. This kerosene is vaporized at the elevated temperature of cell operation and passes along the spiral path defined by the baffles 22. Advantageously, the air or a combination of air and carbon dioxide is introduced from source 21 through pipe 23 between the inner member 12 and the outer member 10 in the direction of the arrow 24. Since the air or combination of air and carbon dioxide is flowing against the flow or in the opposite direction of the flow of the fuel, the air is pre-heated by the exhaust gases near the right-hand end of member 12, as viewed in FIGURE 1. The products of combustion pass out of the open end of member 12 at the right-hand end, as viewed in FIGURE 1, while the waste oxidant and other products of combustion pass out the open end of member 10 at the left-hand end, as viewed in FIGURE 1.

The chemical reaction between the electrodes of the cell is an exothermic reaction and thus serves to foster subsequent chemical reaction by raising the temperature of the reactants. The electrolyte within the porous body 19 may be at a temperature of the order of 200° C. and a pressure of the order of 400 p.s.i. The heated incoming air follows a path defined by spiral baffle 14 between members 10 and 12. The pressure of the air and carbon dioxide on the outside and the pressure of the kerosene vapor on the inside causes the respective gases to pass through the porous electrode surfaces 16 and 18. It is understood in the art that these electrodes must be sufficiently porous to permit the passage of gases therethrough while preventing the escape of the electrolyte.

In contrast with the serially connected prior art type cells, this invention utilizes a high-to-low fuel concentration as it passes in one direction through the inner member of the cell structure, while the air or oxidant passes from a high-to-low concentration in the reverse direction between the inner and outer members. The net results is a constant effect with regard to differences in pressure on the opposite electrode surfaces which furthers the reaction within the electrolyte to a high degree of completion. The air or oxidant can also perform a scavenging action. With this arrangement of structure, the inner and outer members may be extended to open ends at an area in which the temperature is much lower, but since the electrodes are not extended on the inner member, no reaction is taking place within this extension. The extension of the inner member will not be at the same high temperature as the portion of the inner member adjacent the electrodes. The fuels in such a cell are completely oxidized to the extent that it is possible to vent the products of chemical reaction to the atmosphere from the opposite open ends of members 10 and 12.

Referring now to FIGURE 2, there is depicted, partly in section, another illustrative embodiment of this invention in which like reference numerals are employed to designate structures identical with those in FIGURE 1. The principal distinction between the structures of FIGURES 1 and 2 is that the electrodes 16 and 18 are subdivided into a plurality of electrodes 16a–16n and 18a–18n. The baffles, not shown in this embodiment, must be of insulating material. The respective electrode structures are insulated from each other by suitable insulating material 56 and 58 which effectively seals the electrolyte in the porous body 19 and prevents the flow of current between the series of cells. It is understood that this series of cells may be connected in a series-circuit in a manner depicted by conductors such as 59–66, such that the total voltage generated by the device will be the algebraic sum of the voltages of the individual cells. Outlets for the individual cells, connected serially, are designated 67 and 68. It is, of course, understood that these individual cells might have been connected in parallel. However, if that were intended, the device of FIGURE 1 is more appropriate.

While the invention has been described as having the fuel pass through the inner member and the oxidant pass between the inner and outer members, it will be understood that fuel may be fed between the members and oxidant fed into the inner member. Also, the cross sectional areas of the members or the sizes of the members can be proportioned to provide the correct ratio of fuel and oxidant. For example, the inner member may taper from left-to-right, as viewed in FIGURES 1 and 2.

The novel concepts disclosed in relation to these two embodiments may be applied to various other embodiments without departing from the spirit and scope of this invention.

What is claimed is:

1. In a fuel cell system comprising a housing, an electrolyte, at least one oxidizing electrode and at least one fuel electrode, the improvement wherein the system comprises a pair of elongated co-axial members with means for supporting said members in spaced relationship with one another, one of said members defining the fuel electrode, the oxidizing electrode and a porous matrix impregnated with an electrolyte, said co-axial members forming two gas passages and means for feeding fuel into one of said gas passages at one end of said cell and means for feeding an oxidizing material into the other of said gas passages at the end opposite to the means for feeding fuel whereby said fuel and oxidizing gases are introduced at opposite ends of the cell, said gas passages having venting means for removing gaseous impurities and chemical by-products.

2. The fuel cell of claim 1 wherein the gas passages contain baffles defining a tortuous path, whereby more complete cycling of the gases is obtained.

3. A fuel cell according to claim 1 wherein the electrodes are subdivided into a plurality of electrodes, separated from each other by insulating means, and electrically connected in series.

4. The fuel cell of claim 3 wherein the cells are connected in parallel.

References Cited by the Examiner

UNITED STATES PATENTS

| | | | |
|---|---|---|---|
| 409,366 | 8/1889 | Mond et al. | 136—86 |
| 1,359,881 | 11/1920 | Emanuel | 136—86 |
| 2,234,967 | 3/1941 | Gilbert | 204—220 |
| 2,384,463 | 9/1945 | Gunn et al. | 136—86 |
| 2,815,318 | 12/1957 | Shaw et al. | 204—220 |
| 2,894,053 | 7/1959 | Lauzos | 136—87 |
| 2,901,524 | 8/1959 | Gorin et al. | 136—86 |
| 2,925,455 | 2/1960 | Eidensohn et al. | 136—86 |

WINSTON A. DOUGLAS, *Primary Examiner.*

JOSEPH REBOLD, JOHN H. MACK, *Examiners.*

H. FEELEY, *Assistant Examiner.*